United States Patent [19]

Schembri

[11] Patent Number: 4,871,225

[45] Date of Patent: Oct. 3, 1989

[54] FIBER OPTIC DISTRIBUTION NETWORK

[75] Inventor: John J. Schembri, Daly City, Calif.

[73] Assignee: Pacific Bell, San Francisco, Calif.

[21] Appl. No.: 34,087

[22] Filed: Apr. 2, 1987

Related U.S. Application Data

[63] Continuation of Ser. No. 644,206, Aug. 24, 1984, abandoned.

[51] Int. Cl.[4] .............................. G02B 6/28; G02F 1/00
[52] U.S. Cl. ................................ 350/96.76; 350/96.20; 350/96.21; 350/96.22; 350/320; 455/606; 455/612; 455/617
[58] Field of Search ............... 350/96.10, 96.15, 96.16, 350/96.20, 96.22, 96.21, 96.23, 320; 250/227; 455/600, 601, 602, 603, 604, 606, 607, 612, 617, 618; 370/1, 3, 4, 85, 86, 87, 88, 89

[56] References Cited

U.S. PATENT DOCUMENTS

| | | | |
|---|---|---|---|
| 4,015,115 | 3/1977 | Corcoran | 455/600 X |
| 4,027,153 | 5/1977 | Kach | 350/96.16 |
| 4,061,577 | 12/1977 | Bell | 455/600 X |
| 4,182,935 | 1/1980 | Chown | 350/96.16 X |
| 4,187,404 | 2/1980 | Deman et al. | 179/100 R |
| 4,306,313 | 12/1981 | Baldwin | 455/601 |
| 4,366,565 | 12/1982 | Hershowitz | 350/96.16 |
| 4,367,548 | 1/1983 | Cotten et al. | 370/3 |
| 4,501,021 | 2/1985 | Weiss | 455/601 |
| 4,673,246 | 6/1987 | Schembri | 350/96.22 |
| 4,745,592 | 5/1988 | Gabriagues | 350/96.16 X |
| 4,775,210 | 10/1988 | Fioretti | 350/96.16 |
| 4,778,239 | 10/1988 | Shaw et al. | 350/96.16 |
| 4,781,427 | 11/1988 | Husbands et al. | 350/96.16 |

FOREIGN PATENT DOCUMENTS

| | | | |
|---|---|---|---|
| 56-111338 | 9/1981 | Japan | 370/3 |
| 58-177041 | 10/1983 | Japan | 370/1 |

OTHER PUBLICATIONS

Matsunaga et al., "A High-Performance Optical Loop System for Computer Communications" Mitsubishi Denki Giho vol. 54, No. 9, pp. 30-34 1980.

Zeidler, "Application of Fiber Optic Cables in Local Subscriber Networks" Int. Conf. on Comm. Denver Jun. 14-18, 1981, pp. 48.3.1-48.3.3.

Primary Examiner—William L. Sikes
Assistant Examiner—Brian M. Healy
Attorney, Agent, or Firm—Fitch, Even, Tabin & Flannery

[57] ABSTRACT

A method and apparatus are disclosed for providing a fiber optic distribution network between a central office and a group of users generally in a localized area, a continuous optical fiber primary loop in communication with the central office passing in the vicinity of each user, patch devices or units being arranged in the loop for coupling users with the central office through optical fibers in the primary loop. Patch units are preferably arranged in spaced-apart relation along the primary loop, each establishing continuity in selected fibers providing communication access to users associated with other patch units while providing communication access with the central office for its own user or users. Each patch unit is preferably adapted for forming two secondary loops between the user and central location, the two secondary loops including adjacent fibers on opposite sides of the primary loop in order to assure service to the particular user in the event of loss of communication access at any point along the primary loop, sensing and switching means being provided for automatically shifting communication from one secondary loop to another in the event of loss of communication access in the one secondary loop.

16 Claims, 4 Drawing Sheets

FIBER OPTIC DISTRIBUTION NETWORK

This is a continuation of application Ser. No. 644,206, filed Aug. 24, 1984, now abandoned.

BACKGROUND OF THE INVENTION

The present invention is directed toward a fiber optic distribution system and more particularly to such a fiber optic distribution system capable of providing versatile and efficient service to its users.

Communication systems of the type contemplated by the present invention were initially established for transmission of various types of information including audio, video and digital data in the form of electrical signals through electrical transmission lines. Such information may of course comprise telephone signals, television signals, digital data, FM audio signals and the like. More recently, these electrical conductors have often been replaced by optical transmission systems where the information is transmitted through cables or the like formed from optical fibers.

The fiber optic cable may be in the form of one or more individual fibers or it may take the form of a bundle of many fibers. Here again, large numbers of fibers may be assembled in various types of sets such as ribbons each including flat arrays of, for example, 12 fibers. On the other hand, all or part of the fibers may be individually buffered, that is, contained within separate plastic tubes of relatively larger diameter to facilitate handling. In any event, fiber optical systems have become particularly desirable for such applications because of their bandwidth capabilities for handling greatly increased amounts of information, particularly in comparison with electrical transmission lines.

With the expanding use of such fiber optic systems, generally the same configurations of distribution networks have been employed for providing communication access of users as in earlier electrical communications systems. For example, service to large numbers of users in a given area, such as a city, a university or other complex, has been established with central offices or hubbing locations for providing service to groups of users in generally localized areas. A hubbing location commonly replaces a central office in localized areas such as universities and the like. The hubbing location is then interconnected with a central office by a trunk line for associating it with other communication networks. Accordingly, the term "central office" is used broadly in connection with the present invention and includes hubbing locations and other alternative means.

In order to provide service for each of these users from the central office, it has been common practice to provide dedicated lines between the central office and each given user through local networks in the form of conventional star or bus configurations, for example. With large numbers of users in a fixed location such as large buildings or portions of a university, large numbers of lines have been assembled in cables or the like to facilitate interconnection of all of the users with the central office.

At the same time, it has been of course necessary to provide for changes in the numbers and locations of such users within a given area. In the past, this was accomplished by shifting of dedicated lines from one user to another. Thus, where shifting patterns of users have occurred, it has often been necessary to reroute entire cables or portions of cables at very considerable expense.

A related problem concerns the need for assuring continuous service to users in the event of a loss of communications access, due for example to an interruption or break at a given location in a communication system or network. In order to provide redundant service to users upon request for overcoming this problem, it has also been common practice to provide separate dedicated lines for those users requesting redundant service. By arranging these separate lines along different routes, the user could thus be connected with the central office through one of the dedicated lines, communication access for that user being shifted to the other dedicated line through suitable switching equipment in the event of a loss of communication access in the first line. Naturally, the need for such redundant service further multiplies or increases the complexity of transmission systems providing communication access to large numbers of users.

With the increasing use of fiber optic transmission means, it has become possible to impose communications for large numbers of users upon single fibers through the use of conventional multiplexing equipment and the like. However, even with improvements in transmission capabilities made possible by such facilities, communications networks in congested areas such as large cities and the like have become increasingly complex and have necessarily employed relatively excessive amounts of networking cable.

Accordingly, there has been found to remain a need to provide improved distribution systems for communication access, particularly in the field of fiber optics, in order to provide improved services to groups of users in localized areas from central offices or the like while achieving versatility in service for accommodating changing numbers and patterns of users with existing fiber optic cables or the like while also facilitating the provision of redundant service for those users.

SUMMARY OF THE INVENTION

It is therefore an object of the invention to provide a fiber optic distribution system capable of overcoming one or more problems of the type outlined above.

More particularly, it is an object of the invention to provide a fiber optic distribution system with communication access from a central office to a group of users by means of a continuous optical fiber primary loop in communication with the central office, the primary loop being arranged to pass adjacent to each of the group of users and including patch means for coupling one or more selected users with the central office.

It is another object of the invention to provide a method and apparatus for forming a fiber optic distribution network or system for establishing redundant communication access for at least one user by forming a primary loop in communication with the central office and passing in the vicinity of the user, opposite portions of the primary loop being arranged along different routes, patch means being formed in the loop adjacent to the user for establishing two secondary loops between the central office and the user, each secondary loop being formed from adjacent fibers on one of the opposite sides of the loop. Thus, in the event of an interruption in either of the opposite portions of the primary loop, communication access for the user remains available in the secondary loop formed on the opposite side of the primary loop.

It is an even further object of the invention to provide a method and apparatus for forming such a fiber optic distribution system wherein multiple patch means are arranged in spaced-apart relation along the loop in order to provide selective communication access for any of a large number of users in a given locality. Thus, the fiber optic distribution system is particularly adapted for providing service to an area formed for example from several blocks in a city or in a complex such as a university or the like.

It is a related object of the invention to provide such a method and apparatus wherein each of the patch means is adapted for selectively establishing continuity through the loop or for interconnecting one or more users with the central office. Thus, the fiber optic distribution system is particularly effective in providing communication access for changing numbers and distributions of users in a given region or user area. For example, as additional users require service adjacent to one of the patch means, they may simply be interconnected with the central office through existing optical fibers in the loop.

Such service can be of a protected or redundant type with the user being interconnected with the central office through separate secondary loops formed along different routes to the central office. Alternatively, if a user does not require or wish protected or redundant service, he may be interconnected with the central office through a single path formed by any two optical fibers in the primary loop.

If a given concentration of users were to move from a location adjacent to one of the patch means to another patch means, jumper means could be employed in the first mentioned patch means in order to reestablish continuity for the fibers at that point in the primary loop while the users could be similarly interconnected with the central office through the second mentioned patch means.

Thus, substantial advantages are provided in the development of communication access through the method and apparatus for forming a fiber optic distribution system in accordance with the present invention. In particular, development and maintenance of a fiber optic distribution system for an area of blocks in a city or a university complex, for example, is facilitated through use of the present invention since it requires only the laying or arrangement of a single loop of any number of optical fibers throughout the region to be served. With patch means being arranged in spaced-apart relation along the loop, communication access may be provided for any user in the region with the central office in the manner described above.

The method and apparatus of the present invention is also believed to be particularly economical for a number of reasons. Initially, the continuous loop formation provided by the present invention permits communication access to be made available to all users in a given region with less cable or fiber being used for the overall region. For example, where dedicated lines are provided for individual users or groups of users in conventional patterns such as a star or bus configurations, the pattern of cables or lines servicing the given region was substantially more complex compared to the present invention.

At the same time, the present invention is also particularly economical in the maintenance of service for changing numbers and patterns of users since it is no longer necessary to rearrange dedicated lines in order to maintain service. Rather, in accordance with the present invention, it is only necessary to change the interconnection of certain users within a given region for a single patch means or from one patch means to another in order to accommodate such changing numbers and/or patterns of users.

It is a particularly important related advantage of the invention that the various patch means arranged along the continuous loop permit the use of jumpers for establishing continuity between two given fibers at that point or for interconnecting the user through those same fibers. Thus, communication access may readily be initiated or terminated for any given user at one of the patch means in a very simple manner without the need of special splicing tools or the like.

Additional objects and advantages of the invention are made apparent in the following description having reference to the accompanying drawings.

DESCRIPTION OF THE PREFERRED EMBODIMENT

Figure 1:
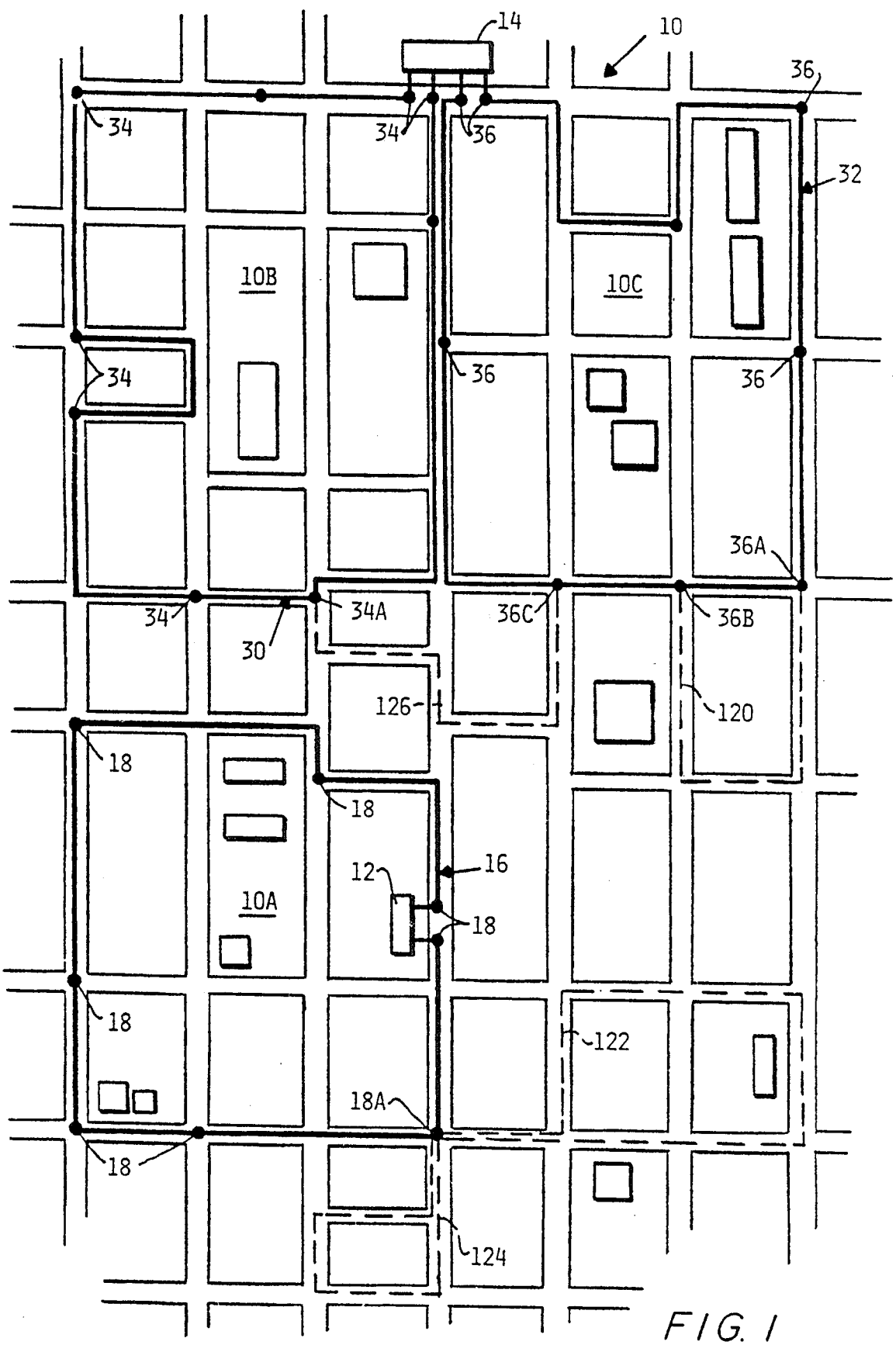
FIG. 1 is a partially schematic representation of a portion of a city while illustrating the arrangement of a number of continuous optical fiber primary loops in accordance with the present invention for selectively establishing communication access to users in respective regions of the city served by those loops.

Referring to the drawings and initially having particular reference to FIG. 1, the present invention contemplates a method and apparatus for providing more effective and economical communication access to users in relatively localized areas. Generally, such areas are anticipated in cities, universities or other complexes where there are relatively large concentrations of such users. As illustrated in FIG. 1, a portion of a city including a number of blocks as indicated at 10 is divided into user areas as generally indicated at 10A, 10B and 10C. Each of these areas is formed by a number of generally contiguous blocks. However, this representation is only illustrative for purposes of the present invention. As will be apparent from the following description, localized groups of users or areas could be selected with many different patterns or configurations depending upon the particular application.

In any event, areas such as those represented in FIG. 1 are typically served from respective central offices in or adjacent to the areas. In FIG. 1, user area 10A is served from a central office 12 while areas 10B and 10C are both connected with a common central office 14.

Additionally, it is contemplated that communication access be provided for each of the areas 10A, 10B and 10C by a fiber optic distribution system suitable for selectively connecting users in each of the areas with the respective central office. In order to facilitate the arrangement of individual fibers or fiber cables for providing access to all users in a given area and also to provide versatility in the distribution system, particularly where the locations and numbers of users may change, the present invention contemplates the arranging of a continuous optical fiber primary loop in communication with the respective central office. The continuous primary loop is then arranged so it passes generally adjacent to users in the respective area.

A continuous optical fiber primary loop is indicated at 16 for serving the area 10A from the central office 12. It is of course to be understood that the primary loop 16 may be employed for users arranged either inside the loop 16 or outside the loop 16 but generally adjacent thereto. The primary loop 16 includes a plurality of patch units 18 arranged in generally spaced-apart relation along the loop 16 in order to provide service if desired to users throughout the area 10A.

The construction and method of operation anticipated for the patch units 18 is described in greater detail below, particularly with additional reference to FIGS. 2 and 3. However, to provide an initial broad understanding of the invention, it is only necessary to understand that a primary loop such as that indicated at 16 includes a relatively large number of optical fibers preferably in the form of a cable. As will be made more apparent below, a primary loop such as that indicated at 16 could also be formed in accordance with the present invention while including only a single optical fiber or a relatively limited number of such fibers. At the same time, within the primary loop 16, the patch units 18 are each adapted to permit rapid connection of users within the area 10A with the central office 12 by one or more optical fibers in the primary loop 16 through a respective patch unit 18. The manner in which users are interconnected with the central office through the respective patch units is discussed in greater detail below, having particular reference to FIGS. 2 and 3. However, for an initial understanding of the invention, the patch units 18 are adapted to provide continuity for all optical fibers which are not being used for communication access by users at the respective patch unit.

Figure 4:
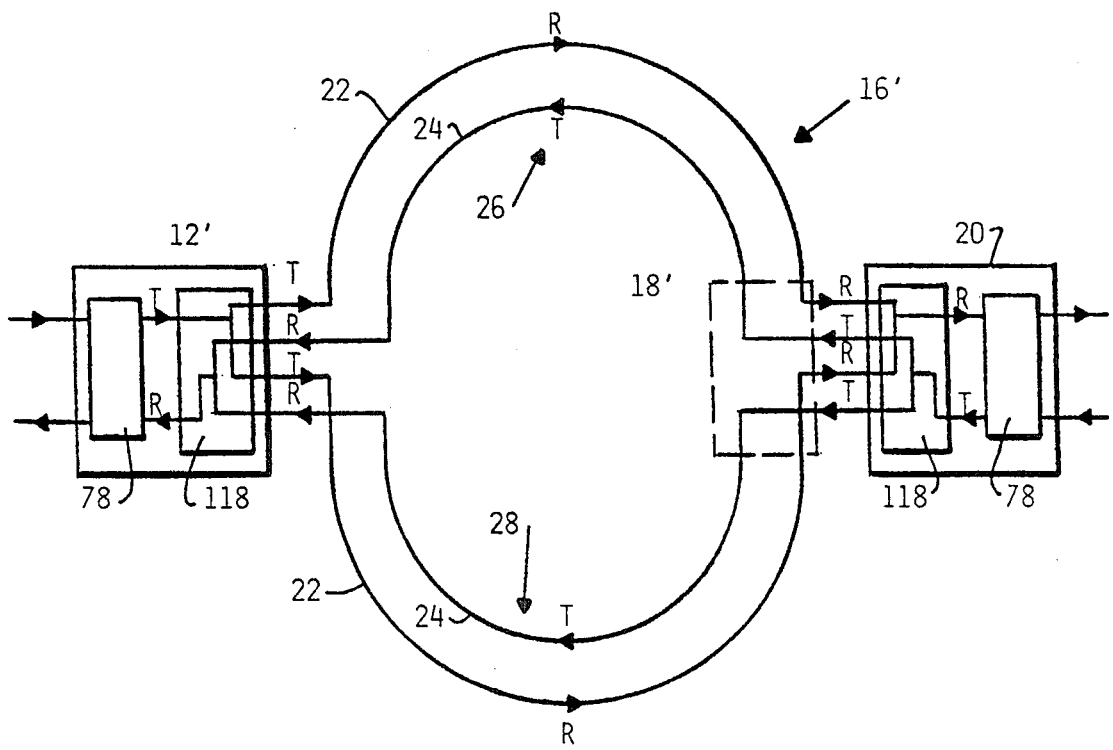
FIG. 4 is a schematic representation of a continuous loop for interconnecting one or more users with a central office through respective secondary loop portions formed from any of the primary loops of FIGS. 1 or 2 for establishing redundant service for each user or users.

Having particular reference to FIG. 4, the present invention also contemplates a method and apparatus for providing redundant or protected communication access or service to various users within given areas at their request. In satisfying this requirement, the invention contemplates forming a primary loop 16' for interconnecting a user 20 with a central office 12'. It will thus be apparent that the schematic representation of FIG. 4 illustrates generally the same primary loop and central offices as that referred to at 16 for serving user area 10A in FIG. 1. However, the primary loop has been simplified in FIG. 4 in order to better illustrate its function for providing redundant service to the user 20. The user 20 is interconnected with at least two optical fibers 22 and 24 arranged within the loop 16'. Furthermore, the user 20 is interconnected with the optical fibers 22 and 24 through a patch unit 18' in a manner forming complete secondary loops 26 and 28 on opposite sides or portions of the primary loop 16'. The two secondary loops or opposite portions of the primary loop are spaced apart from each other and arranged along different routes so that they will not tend to be subject to interruption of communications access at the same time.

As described in greater detail below, each of the secondary loops 26 and 28 includes adjacent fibers providing reception and transmission capabilities respectively for the user 20 relative to the central office 12'. Communication access for the user 20 is thus established with the central officer 12' through either of the secondary loops 26 and 28. Redundant or protected service is established for the user 20 in that he is relatively assured of communication access with the central office 12' through one or the other of the secondary loops 26 and 28. The manner in which such alternative communication access is established is described below. However, in summary, it is to be noted that redundant service may be supplied, upon request, to any user in any of the areas 10A, 10B or 10C of FIG. 1 in a generally similar manner.

To describe the present invention in greater detail, having reference initially to FIG. 1, the user areas 10B and 10C are serviced by primary loops 30 and 32 which are substantially similar to the primary loop 16 for user area 10A except that the primary loops 30 and 32 are separately interconnected with the single central office 14. The primary loops 30 and 32 each include a plurality of patch units indicated respectively at 34 and 36. Otherwise, the fiber optic distribution systems represented by the primary loops 30 and 32 are substantially similar to that indicated at 16 in FIG. 1 and are not further described in detail. Generally, each of the primary loops illustrated in FIG. 1 is similar to that indicated at 38 in FIG. 2. However, it is to be kept in mind that many variations are possible for the loop configuration in a fiber optic distribution system constructed in accordance with the present invention.

Figure 2:
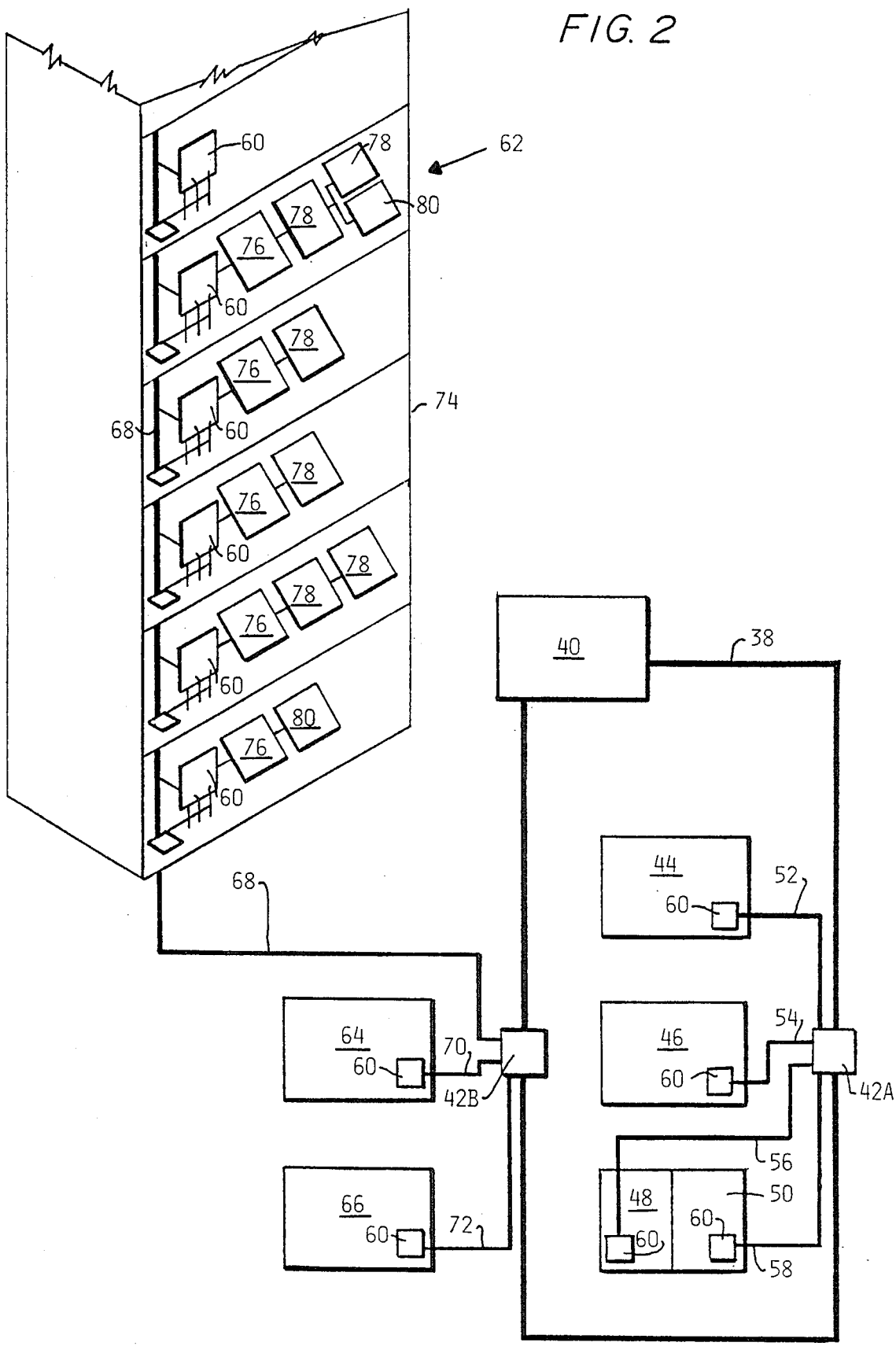
FIG. 2 is an enlarged schematic representation of a single loop in a fiber optic distribution system formed in accordance with the present invention in order to better illustrate its versatility in providing communication access to users in a given region.

Referring now to FIG. 2, the primary loop 38 is interconnected with a central office 40 and has patch units 42 arranged in spaced-apart relation along its length. For simplicity, the primary loop 38 of FIG. 2 is illustrated as including only two patch units 42. Normally, each of the patch units 42 will be arranged in an accessible location such as a manhole (not shown) along the route of the primary loop 38.

Each of the patch units 42 in turn is interconnected with one or more users. For example, the patch unit 42A provides means for interconnecting selected fibers from the loop 38 with different customers or users 44, 46, 48 and 50. Users 44 and 46 are located in separate buildings while users 48 and 50 are illustrated within a single building. In accordance with the present invention, each of the users 44–50 is interconnected with the central office through the primary loop 38 and respective secondary loops 52, 54, 56 and 58. An interface panel means 60 provides direct communication access for the respective users with the fibers.

Similarly, the other patch unit 42B is interconnected with users 62, 64 and 66 through secondary loops 68, 70 and 72. In accordance with the summary above and the following detailed description relating to FIG. 4, each user may selectively be provided with either protected (redundant) or unprotected service.

It is necessary to assure that each primary loop such as that indicated at 38 provides sufficient capacity for all existing users and users contemplated in the foreseeable future. Thus, each loop is formed with a substantial number of fibers which, together with conventional multiplexing service, provides a large number of circuits for supplying communication access to the users. Preferably, each of the primary loops such as that indicated at 38 as well as the primary loops indicated in FIG. 1 and elsewhere, include 144 fibers. Preferably, the 144 fibers are in the form of 12 ribbons (not otherwise shown). However, such ribbons are of conventional construction wherein a number of fibers, for example 12, are arranged in side-by-side relation between flexible strips of plastic in order to facilitate or simplify handling of large numbers of fibers. Twelve such ribbons may be formed together in a cable-like configuration of 144 fibers with a protective covering of conventional design (not shown) to form the complete primary loop such as that indicated at 38.

Each of the secondary loops serving respective users includes a variable number of fibers depending upon the number of circuits required by each user. Here again, each secondary loop such as that indicated at 68 for example, includes a number of fibers arranged together in a protective casing to form a buffered drop cable (not shown) for connection with the respective user.

The manner in which actual service is provided to one user, for example that indicated at 62, is illustrated in somewhat greater detail in order to assure a complete understanding of the invention. However, it is again noted that the scope of the present invention is directed toward the manner in which the primary loop 38, the patch units 42 and the respective secondary loops provide communication access for the individual users with the central office 40. As illustrated in FIG. 2, the user 62 is contemplated as occupying multiple floors in a high-rise building generally indicated at 74. The secondary loop 68 providing service to the user 62 passes vertically through the various floors of the building 74. Typically, the secondary loop 68 includes for example from 2-4 fibers for each floor. At each floor, the respective fibers are interconnected through interface panel means 60. A light guide cable interconnection terminal 76, again of conventional construction, is arranged on each floor for interconnection with the respective interface panel means. In order to provide desired service for each floor of the user building 74, one or more multiplexers 78 and/or voice channel modules 80 are provided in connection with each of the terminals 76. The manner in which these components are interconnected with various user circuits is not described in greater detail since it is of completely conventional construction and does not form a portion of the present invention.

As indicated above, each of the patch units such as those indicated at 18 in FIG. 1 and 42 in FIG. 2 is contemplated for providing communication access to one or more users while otherwise providing continuity in additional fibers contemplated for providing service through other patch units. At the same time, each of the patch units permits rapid interchange of fibers between users in order to accommodate for shifting locations and numbers of users. A patch unit such as those indicated at 18 and 42 is described and claimed in greater detail within a co-pending application Serial No. 644,318, entitled PATCH UNIT FOR FIBER OPTIC DISTRIBUTION NETWORK, now U. S. Pat. No. 4,673,246. However, one such patch unit 18 is shown in generally schematic fashion in FIG. 3 in order to permit a complete understanding of the present invention.

Figure 3:
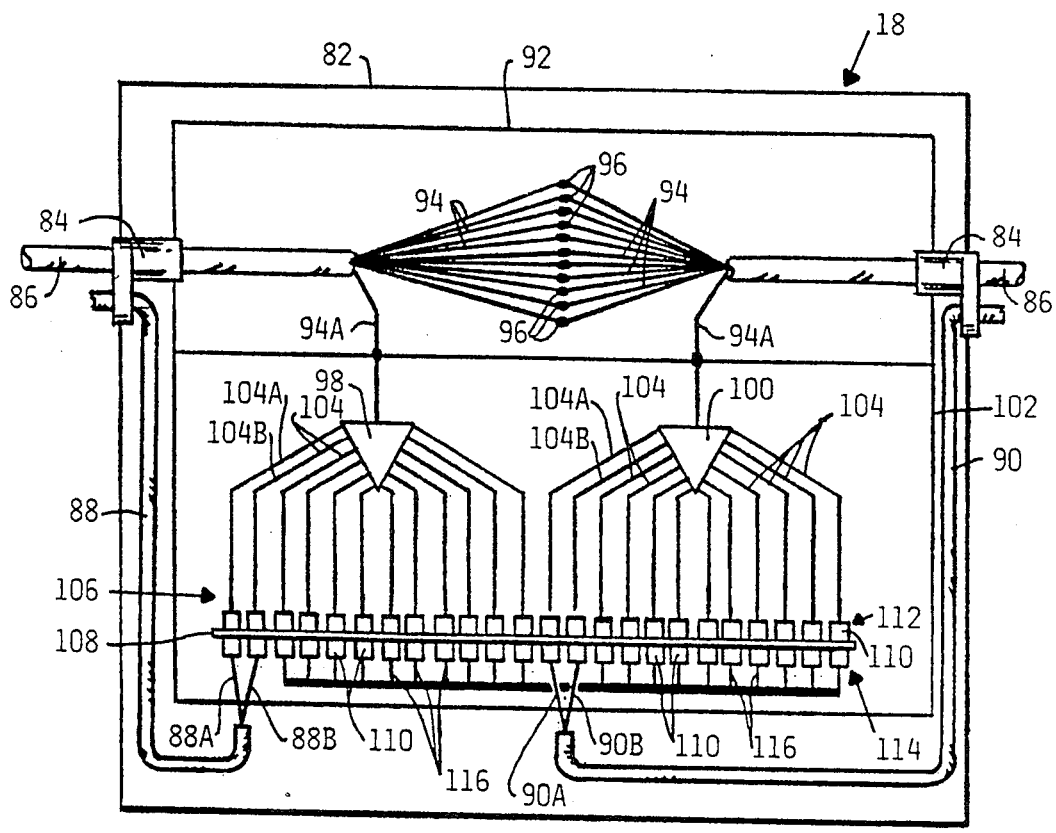
FIG. 3 is an enlarged view, in schematic form, of one of a plurality of patch assemblies adapted for use in each of the loops illustrated in FIGS. 1 and 2.

Referring to FIG. 3, each patch unit 18 preferably includes splice means for establishing continuity in fibers employed for communication access at other locations by means of separate patch units. Accordingly, the patch unit 18 of FIG. 3 comprises a splice housing 82 including grommet means 84 at each end. The grommet means 84 permit a feeder cable 86 representing the primary loop 16 of FIG. 1 for example, to enter and exit the splice housing 82. The grommets 84 are formed with multiple openings in order to also permit drop cables or secondary user loops such as those indicated at 88 and 90 to enter the splice housing 82. As will be described in greater detail below, the cables 88 and 90 represent secondary loops for interconnecting selected users with the primary loop including the patch unit 18.

Within the splice housing 82, both ends of the feeder cable 86 pass into a splicing chamber 92 where the 12 optical fiber ribbons 94 are separated from each other, opposite ends of the optical fiber ribbons being interconnected with each other by means of ribbon splices 96 in order to maintain continuity for all fibers in those ribbons within the patch unit 18.

One optical fiber ribbon 94A has its opposite ends interconnected with respective fanouts 98 and 100 arranged in a fiber patch housing 102. Within the respective fanouts 98 and 100, the 12 individual fibers within each end of the ribbon 94A are separated from each other and respectively interconnected with an array of 24 connectors generally indicated at 104. The connector array 104 includes an elongated plate 106 with conventional tubular connectors 108 arranged along its length. The connectors 108 are of conventional construction permitting optical fibers to be inserted into aligned connector ports (not otherwise shown) extending through each of the connectors 108.

As illustrated in FIG. 3, the 24 individual fiber ends 104 are placed in communication with one side 112 of the respective connectors 110. With this arrangement, the other side 114 of the connectors provides access for using any number of the fibers 104 for users serviced by the particular patch unit 18. As illustrated in FIG. 3, two fibers 104A and 104B are placed in communication with corresponding fibers 88A and 88B on one side of the patch housing 102 while the other ends of the fibers 104A and 104B are similarly interconnected with fibers 90A and 90B on the other side of the patch housing. Thus, the cables 88 and 90 may be employed for interconnection with a single user to provide protected or redundant service in the manner illustrated by the secondary loops 26 and 28 of FIG. 4. In other words, the fibers 88A and 88B together with the fiber portions 104A and 104B with which they are interconnected form one secondary loop corresponding for example to that indicated at 26 in FIG. 4. Similarly, the other two fibers 90A and 90B and the associated fiber portions 104A and 104B with which they are interconnected form another secondary loop corresponding for example to that indicated at 28 in FIG. 4.

All of the other connectors 110 are interconnected on their outlet sides 114 with corresponding jumpers 116 in order to provide continuity at least at the point of the particular patch unit 18 for each of the fibers 104 which are not employed by a user at that location.

It will of course be apparent that many other user arrangements are possible for each of the patch units 18. As noted above, as few as one single fiber representing two connections with the connectors 110 could be employed at any given patch unit 18 in order to provide service to a single user. However, in such an example, it is to be noted that service for that user would be unprotected. If that particular user desired protected or redundant service, it would be necessary to employ at least two fibers in the manner described above and elsewhere with respect to FIG. 4.

The versatility of the present invention is also made particularly apparent from FIG. 3. Since there may be as few as one patch unit in a primary loop or a plurality of such patch units, great versatility is permitted by the arrangement of the present invention. Initially, any number of users may be readily interconnected into the primary loop simply by use of the exposed connectors 110. If desired, it would also of course be possible to replace the fiber ribbon 94A with any of the other 11 ribbons in connection with the fanouts 98 and 100 for achieving any desired arrangement within a given communications loop. Use of connectors such as those indicated at 110 is further to be desired since connections with the exposed fibers 104 may readily be established without the need of special tools or the like simply by inserting fiber ends such as those indicated at 88A and 88B into the connectors.

Referring now to FIG. 4, each user 20 and the central office 12' include corresponding multiplexer units 78 so that the same number and arrangement of communication channels are applied to each fiber both for the user and the central office. It is understood that both the user location 20 and the central office 12' include additional means for converting electrical signals of one type or another to light transmission for example by conventional laser means (not otherwise shown).

Otherwise, the manner in which the two secondary loops 26 and 28 of FIG. 4 serve to provide redundant service for a user such as that indicated at 20 is more readily apparent from the preceding descriptions of FIGS. 1 and 3. Referring particularly to FIG. 4, each adjacent pair of fiber portions 22 and 24 forming either of the secondary loops 26 or 28 are respectively adapted for providing reception and transmission capabilities between the central office 12' and user 20. Both the central office 12' and each user 20 are also provided with respective switch and sensor means 118. The switch and sensor means 118 are of conventional construction except for the manner in which they are used in the present invention. Generally, the switch and sensor means 118 in both the central office 12' and user 20 are adapted for directing communication between those parties through one of the secondary loops, for example that indicated at 26. The switch and sensor means 118 also has the capability of detecting an interruption of communication access through the secondary loop 26. In the event of such an interruption, the switch and sensor means 118 for the central office 12' and user 20 immediately direct communication access between those parties through the other secondary loop 28 in order to assure continuous communication access for the user 20. As noted above, the secondary loops 26 and 28 are formed by opposite portions of a primary loop 16' and are accordingly arranged along different routes between the central office 12' and the user 20 in order to prevent simultaneous interruption of communication access in both secondary loops. It will also be apparent that redundant service of the type provided by the two secondary loops 26 and 28 can also be provided within any of the primary loops illustrated in FIG. 1 and at any of the patch units 18 therein. Thus, redundant service is available to all users in the vicinity of any given loop.

An additional degree of versatility is provided by the present invention in that the user area covered by one or more loops may be adjusted if necessary by forming branch loops of different combinations. In this regard, attention is again directed to FIG. 1 wherein a number of such branch loops are illustrated. Such branch loops may be connected through patch units of a single primary loop or through patch units of separate primary loops if there is a means for completing the branch loop, for example, in a common central office for the two primary loops.

One such branch loop is indicated at 120 which is interconnected between patch units 36A and 36B of the primary loop 32 for user area 10C. Referring also, for example, to FIGS. 2 and 3, corresponding fibers in the primary loop 32 are employed for completing communication of the branch loop 120 with the central office 14. Here again, each such branch loop is formed from a single fiber or from any greater number of fibers. As noted elsewhere, two fibers would be necessary in the branch loop 120 in order to provide redundant service. Another branch loop 122 is illustrated in FIG. 1, both ends of the branch loop 122 being interconnected with a single patch unit 18A in the primary loop 16 for user area 10A. Continuity for all optical fibers in the branch loop 122 would of course be provided with the central office 12 through the patch unit 18A in the same manner described above with reference to FIG. 3.

Furthermore, combinations of branch loops may be provided even from a single patch unit such as that indicated at 18A. For example, note in FIG. 1 that an additional branch loop 124 is also formed upon the patch unit 18A along with the branch loop 122.

Another variation of a branch loop in accordance with the present invention is illustrated at 126 in FIG. 1. The branch loop 126, however, is formed between patch units 36C and 34A which are of course arranged in separate primary loops 32 and 30 respectively for user areas 10C and 10B. Since both primary loops 30 and 32 for the user areas 10B and 10C are interconnected with a single central office 14, the branch loop 126 may be completed at that common central office.

Within each of the branch loops described above, it would of course be possible to employ one or more additional patch units. However, each additional patch unit in a given loop introduces additional transmission or decibel losses. Thus, the total number of patch units necessary for completing any loop in communication with a given central office must be limited according to the amount of communication loss introduced into the loop.

Accordingly, there has been described a method and apparatus for providing a novel fiber optic distribution system for providing communication access from a central office or a group of central offices to one or more groups of users. Various modifications in additional to those described above will readily be apparent to those skilled in the art. The scope of the present invention is therefore defined only by the following appended claims.

What is claimed is:

1. A fiber optic distribution system for providing communication access between a central office and a plurality of users generally in a localized area, said fiber optic distribution system comprising:

an optical fiber primary loop comprising at least 4 optical fibers in communication with the central office, said primary loop leaving said central office from a first point therein and returning to a second point in said central office, said primary loop being arranged to pass in the vicinity of each user of the group of users, and patch means arranged in said primary loop for coupling a selected user with the central office through said primary loop, said patch means including means for interrupting two optical fibers in said primary loop to create first and second pairs of optical fibers, each said pair of optical fibers providing a bidirectional communication path between said user and said central office, said first pair of optical fibers providing a bidirectional communication path to said first point in said central office and said second pair of optical fibers providing a bidirectional communication path to said second point in said central office, each said pair of optical fibers coupling no more than one said user to said central office.

2. The fiber optic distribution system of claim 1 wherein different portions of said primary loop are substantially spaced-apart to reduce the probability that an event leading to an interruption in said primary loop will result in said primary loop being interrupted in more than one place.

3. The fiber optic distribution system of claim 2 wherein each of said user comprises a plurality of telephone lines, each said telephone line being identified by a different telephone number.

4. The fiber optic distribution system of claim 1 wherein redundant communication access is provided for at least one user; and wherein said patch means further comprises
   switch means for connecting said user to said central office by either said first or second pairs of optical fibers;
   means for detecting an interruption in the communication path through the said pair of optical fibers currently connecting said user to said central office; and
   means for causing said switch means to connect said user to said central office by the other of said two pairs of optical fibers when said interruption is detected by said detection means.

5. The fiber optic distribution system of claim 4 wherein said detection means further comprises means for providing a warning signal indicating said detecting means detected an interruption.

6. The fiber optic distribution system of claim 1 wherein each said patch means further comprises splice means for establishing continuity through said patch means for optical fibers serving users through other patch means.

7. The fiber optic distribution system of claim 1 further comprising two similar primary loops served from separate central offices.

8. The fiber optic distribution system of claim 7 further comprising coupling means between said central offices of said two primary loops for establishing communication access between said two primary loops.

9. The fiber optic distribution system of claim 8 wherein said coupling means comprises a branch loop interconnected through two said patch means, each said patch means being located in a different one of said two primary loops.

10. A method for providing redundant fiber optic communication access from a central office to a user, said method comprising the steps of
    forming a primary loop of at least four optical fibers in communication with the central office,
    arranging different portions of said primary loop along different routes from the central office to a point in the vicinity of the user, and
    interconnecting the user into said primary loop at said point by interrupting two optical fibers in said primary loop, said optical fibers not currently providing a communication path between any user and said central office, thus forming first and second secondary loops between the central office and user, each said secondary loop comprising means for establishing a bidirectional communication path between said user and said central office, said first and second secondary loops being arranged along different routes from said central office.

11. The method of claim 10 further comprising the step of alternatively establishing communication access between the central office and the user through one of said first and second secondary loops by interconnecting switch means connected to said two secondary loops.

12. The method of claim 10 further comprising the step of forming at least two similar primary loop.

13. The method of claim 11 further comprising the step of providing separate central offices for said two primary loops with coupling means therebetween for establishing communication access between said two primary loops.

14. The method of claim 13 further comprising the step of forming a branch loop and interconnecting said branch loop through patch means located respectively in said two primary loops.

15. The method of claim 10 further comprising the step of forming a branch loop and interconnecting said branch loop through first and second patch means in said primary loop.

16. The method of claim 10 further comprising the step of forming a branch loop and interconnecting it with said primary loop through one patch means therein.

* * * * *

UNITED STATES PATENT AND TRADEMARK OFFICE
CERTIFICATE OF CORRECTION

PATENT NO. : 4,871,225
DATED : October 3, 1989
INVENTOR(S) : John J. Schemri

It is certified that error appears in the above-identified patent and that said Letters Patent is hereby corrected as shown below:

Column 1, line 40, insert --to given sets-- before "of".

Column 11, line 24, after "each" delete "of".

Column 11, line 43, "detection" should be --detecting--.

Column 12, line 36, "loop" should be --loops--.

Column 6, line 6, "officer" should be --office--.

Column 10, lines 52-53, "additional" should be --addition--.

Signed and Sealed this

Twenty-eighth Day of May, 1991

Attest:

HARRY F. MANBECK, JR.

Attesting Officer

Commissioner of Patents and Trademarks